(12) United States Patent
O'Donnell

(10) Patent No.: US 7,204,205 B2
(45) Date of Patent: Apr. 17, 2007

(54) VEHICLE CONSOLE PET SEAT

(76) Inventor: Norman J. O'Donnell, 90 Allen St., Greenville, SC (US) 29605

( * ) Notice: Subject to any disclaimer, the term of this patent is extended or adjusted under 35 U.S.C. 154(b) by 394 days.

(21) Appl. No.: 10/874,899

(22) Filed: Jun. 23, 2004

(65) Prior Publication Data

US 2005/0284415 A1    Dec. 29, 2005

(51) Int. Cl.
*A01K 1/035*    (2006.01)
*A01K 29/00*    (2006.01)

(52) U.S. Cl. .................. 119/771; 119/28.5; 119/496

(58) Field of Classification Search ........... 119/771, 119/28.5, 453, 452, 482, 496, 497; 297/250.1, 297/251–256, 256.1, 256.11–256.17, 184.13, 297/452.12, 452.13, 219.12; D30/118
See application file for complete search history.

(56) References Cited

U.S. PATENT DOCUMENTS

| | | | |
|---|---|---|---|
| 2,909,154 A | 10/1959 | Thomas | 119/109 |
| 3,791,694 A * | 2/1974 | Roberts et al. | 297/250.1 |
| 3,922,035 A * | 11/1975 | Wener | 297/256.13 |
| 5,551,373 A | 9/1996 | O'Donnell | 119/28.5 |
| 5,685,258 A | 11/1997 | Fricano | 119/28.5 |
| 5,718,191 A | 2/1998 | O'Donnell | 119/771 |
| D392,775 S | 3/1998 | McMahon | D30/118 |
| D396,332 S | 7/1998 | McMahon | D30/118 |
| D400,313 S | 10/1998 | Chatwell | D30/118 |
| 6,024,046 A | 2/2000 | Geiger et al. | 119/28.5 |
| 6,079,370 A | 6/2000 | Al-Birmani et al. | 119/771 |
| D427,731 S | 7/2000 | Copple | D30/118 |
| D435,704 S | 12/2000 | Friberg | D30/118 |
| 6,237,999 B1 | 5/2001 | Hobson | 297/256.15 |
| 6,374,771 B1 | 4/2002 | Zwickle | 119/28.5 |
| D461,966 S | 8/2002 | Reece | D6/356 |
| 6,588,365 B2 | 7/2003 | Best Wright | 119/28.5 |
| 6,591,787 B1 | 7/2003 | Gantz et al. | 119/771 |
| 2005/0236874 A1 * | 10/2005 | Godshaw et al. | 297/35 |
| 2005/0253444 A1 | 11/2005 | Godshaw et al. | 297/452.12 |

FOREIGN PATENT DOCUMENTS

JP    2002159239 A  *  6/2002
JP    2005348700 A  *  12/2005

* cited by examiner

*Primary Examiner*—Son T. Nguyen
(74) *Attorney, Agent, or Firm*—Joseph T. Guy; Nexsen Pruet, LLC

(57) ABSTRACT

A console pet seat. The console pet seat comprises a central frame comprising sides and a bottom forming a bed section. A front strap forms a loop for securing to a vehicle console. A rear strap assembly comprises a primary strap with a first end and a second end. A first secondary strap is attached to the first end of the rear strap and a second secondary strap attached to the second end of the rear strap. A tether is attached to the primary strap between the first end and the second end and located in the bed section.

20 Claims, 3 Drawing Sheets

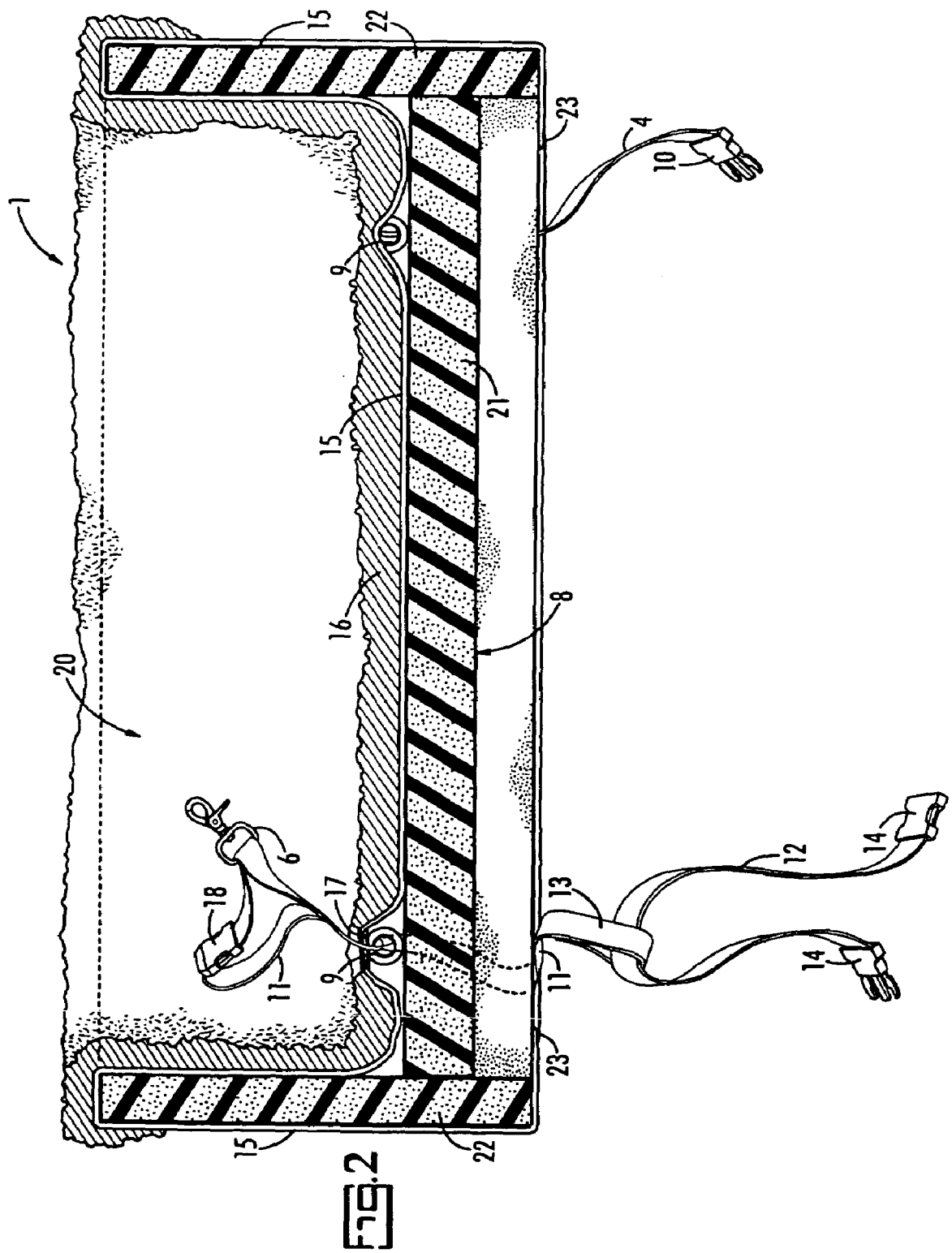

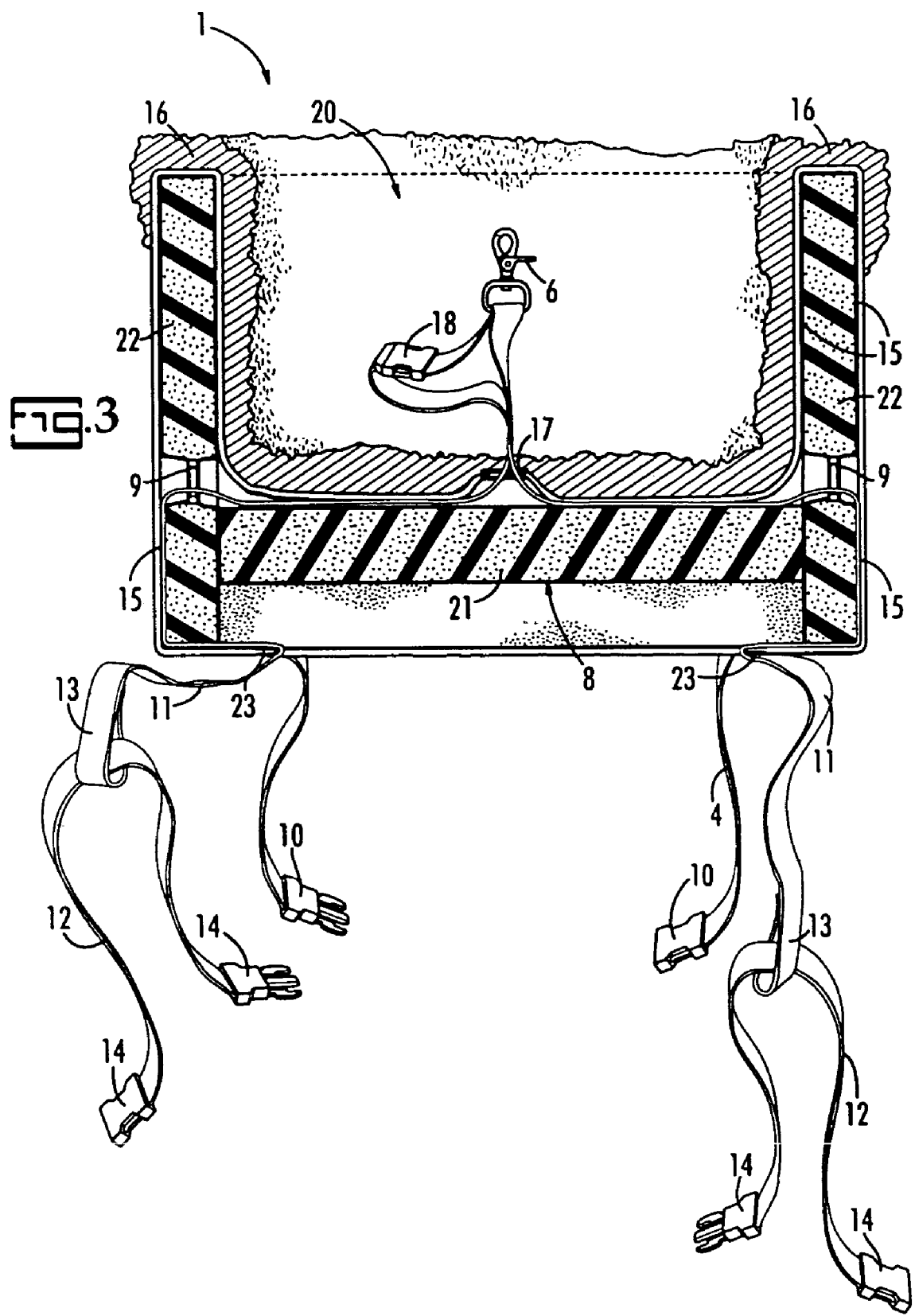

VEHICLE CONSOLE PET SEAT

BACKGROUND OF THE INVENTION

The present invention is related to a pet seat for use in a vehicle. More particularly, the present invention is related to a pet seat secured to the console of a vehicle while the pet is restrained by a harness which is, in turn, secured to vehicle structure.

It has long been a desire to allow pets to travel in vehicles. It is known that pets traveling in a vehicle can create particular safety problems for the driver including interfering with the steering mechanism or pedals and obstructing the view of the driver. These safety problems are to be avoided.

In addition to the safety problems associated with interference there are safety risk to the pet if an accident occurs. In most jurisdictions passengers are required to be secured by safety belts to limit injury if a collision occurs. Pets are not required to be secured and, in the event of a collision, can be catapulted within the vehicle causing harm to the pet or passengers.

Many devices have been developed for transporting a pet in a vehicle. Many of these involve a strap, of some type, for securing the pet seat to the vehicle. Examples include the Portable Pet Booster Seat Apparatus of O'Donnell described in U.S. Pat. No. 5,551,373 wherein the car seat belt secures the pet seat. The pet is unrestrained. A similar apparatus is described as a Pet Carrier Apparatus, also by O'Donnell, in U.S. Pat. No. 5,718,191 wherein the pet is ultimately secured to the seat post of a bicycle.

In most instances the pet is secured to the pet seat instead of directly to the vehicle. While being secured to the pet seat is helpful the ability to adequately restrain a pet during a collision is limited by the structural integrity of the pet seat. It is desirable to have a soft pet seat for comfort. This is contrary to the desire to have high structural strength.

Yet another problem with the pet seats available in the art is the fact that they occupy a seat which could otherwise be utilized by a human passenger. It is desirable to place the pet in a place which is otherwise not usable by a human passenger such as on the center console. A pet seat for such use is described in U.S. Pat. No. 6,591,787 to Gantz et al. The pet is restrained by a leash to the pet seat. The pet seat itself, however, is only secured from moving in a forward direction. If the vehicle accelerates rapidly, or is hit in the rear, the pet and seat can be dislodged in a rearward direction. Furthermore, the pet seat described by Gantz et al., renders the console inaccessible. Consoles are typically used to store a variety of items. If the console is opened the device of Gantz et al. would easily slide into the rear of the vehicle which is undesirable.

There has been a long felt desire for a pet seat which can utilize the console and which does not render the console inaccessible. There is also a desire to provide a pet seat for a vehicle which secures the pet to structural elements of the vehicle thereby enhancing safety in the event of a collision. The present invention meets these goals.

SUMMARY OF THE INVENTION

It is an object of the present invention to provide a pet seat which can be secured to a console of a vehicle without hindering access to the contents of the console.

It is another object of the present invention to provide a pet seat which easily secures the pet to structural elements of the vehicle without alteration of the vehicle.

A particular feature of the present invention is the simplicity of design and the ability to remove portions of the pet seat for cleaning.

These and other advantages, as will be realized, are provided in a method for providing a pet seat in a vehicle. The method comprises placing a console pet seat on a console of the vehicle. The console pet seat comprises a front strap and a rear strap assembly. The front strap is placed to circumvent the console lid and the rear strap assembly is attached to a vehicle structural element.

Yet another advantage is provided in a console pet seat. The console pet seat comprises a central frame comprising sides and a bottom forming a bed section. A front strap forms a loop for securing to a vehicle console. A rear strap assembly comprises a primary strap with a first end and a second end. A first secondary strap is attached to the first end of the rear strap and a second secondary strap attached to the second end of the rear strap. A tether is attached to the primary strap between the first end and the second end and located in the bed section.

BRIEF SUMMARY OF THE DRAWINGS

FIG. 2 is a cross-sectional view of the pet seat of FIG. 1.
FIG. 3 is a cross-sectional view taken perpendicular to the cross-sectional view of FIG. 2.

DETAILED DESCRIPTION OF THE INVENTION

Figure 1:
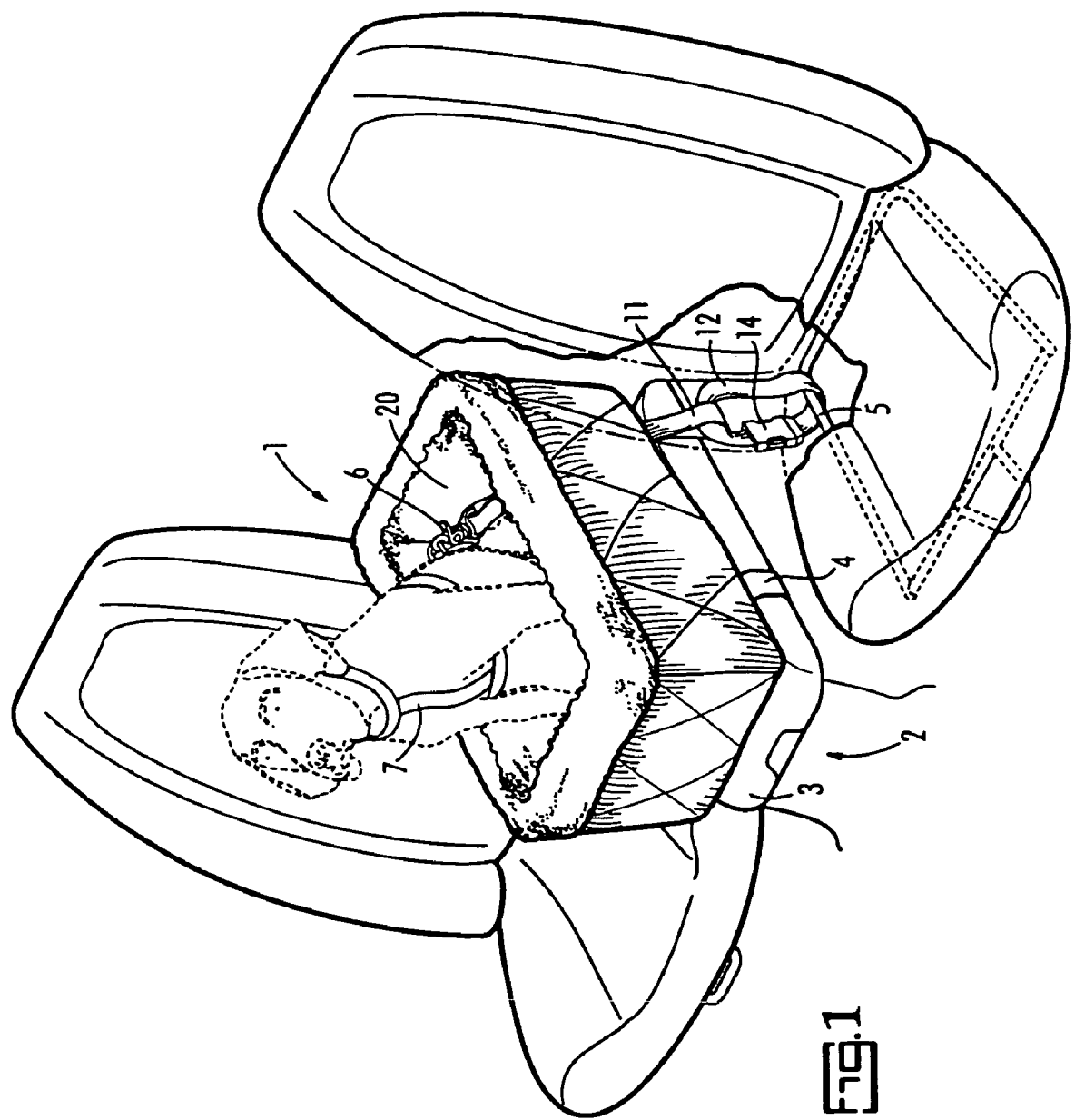
FIG. 1 illustrates an inventive pet seat as used in a vehicle.

The invention will be described with reference to the various figures forming an integral part of the present invention. In the various figures similar elements will be numbered accordingly.

A console pet seat, generally represented at 1, is shown in FIG. 1 as utilized on a console, 2, of a vehicle. The console, 2, typically comprises a top, 3, which is hinged to allow access to items stored in the console. The console pet seat is specifically designed to allow the top to be opened without having to remove the console pet seat. A front strap, 4, wraps around the top, 3, thereby securing the seat to the console. A rear strap assembly, comprising a primary loop 11, a secondary loop 12 and mating latches 14, which will be described in more detail herein, secures the console pet seat to a vehicle structural element, 5. A tether, 6, is connected to the rear strap assembly and to the pet at a harness, 7, thereby providing a secure attachment between the pet and the vehicle. The console pet seat comprises a bed portion, 20, formed by walls within which the pet resides during travel.

Cross-sectional views of the console pet seat are provided in FIG. 2 taken from front to back and in FIG. 3 taken from side to side. The console pet seat comprises a central frame, 8, preferably in the general shape of an open top rectangle with an elevated bottom, 21, and side walls, 22. The central frame is preferably made of closed cell foam due to the advantages of weight, low cost, simplicity of manufacture and flexibility. The central frame can be of unitary construction or manufactured from a floor panel and four side panels glued together as known in the art of foam construction. The front strap, 4, is preferably a single loop passing through grommets, 9, on either side to prevent tearing of the central frame. The front strap, 4, preferably terminates at mating latches, 10, to facilitate securing the front strap around the console. An elastic front strap can be employed.

The rear strap assembly comprises a primary loop, 11, with the tether, 6, approximately centrally located thereon and within the interior bed portion, 20, of the console pet seat. At each terminus of the primary loop, 11, is a secondary loop, 12, which, in use, is secured to a vehicle structural element as described further herein. The secondary loop may be attached to the primary loop by passing through a closed terminal loop, 13, formed by sewing or the like, or the secondary loop may be directly attached by sewing, or the like, to the primary loop. Mating latches, 14, at either end of the secondary loop are preferred to facilitate attachment, and removal of the console pet seat from the vehicle. A mating latch, 18, may be incorporated in the primary loop, 11, to facilitate removal of the tether, 6.

A cover comprising a backing, 15, such as a fabric or the like is preferred to protect the frame from soil and the like. The cover preferably comprises a cushion, 16, of a soft material on the fabric to provide a soft rest area for the pet. Preferable soft materials include felt, fur and the like. It is most preferable that all elements of the cover be machine washable. A void, 17, in the cover is preferably provided for passing the primary loop, and associated tether, through to remove the cover for washing. The cover may also have an elastic edge, 23, around the lower edge to draw the cover towards the center thereby prohibiting undesirable removal.

Grommets, 9, are preferably employed at each passage of the strap through an element of the console pet seat.

The rear strap assembly may be rubber, cloth, hemp or any similar flexible material with a low stretch modulus. It is preferred that the strap not stretch significantly as would be appreciated from the description herein. Woven cloth is the most preferred due, in part, to the high strength, low weight, low cost and the ease with which woven cloth straps can be sewn into the various components described herein. Adjustment elements may be incorporated into the strap as desired or into the latches as commonly known in the art. The front strap may stretch more than the rear straps since the front strap is primarily to secure the pet seat to the console whereas the rear straps are primarily to secure the pet within the seat.

The vehicle structural element can be a seat belt or a seat structural element such as a seat back strut or seat frame element. One advantage provided by the present invention is the ability to secure the tether to a structural element thereby providing a secure attachment point for the pet.

In use, the pet set is positioned on the console. The top of the console is lifted a sufficient amount to allow the front strap to be secured around the console. The rear strap assembly is then secured to a vehicle structural element such that the secondary loop circumvents the vehicle structural element. The straps are drawn tight and the pet seat is ready to accept a pet. It would be apparent that the tether is secured to a harness or collar of the pet.

The invention has been provided with particular emphasis on the preferred embodiments. It would be readily apparent from the description herein that other embodiments, alterations and configurations could be envisioned without departing from the scope of the invention which is more specifically set forth in the claims appended hereto.

The invention claimed:

1. A console pet seat comprising:
a vehicle console comprising a top;
a central frame comprising sides and a bottom forming a bed section;
a front strap forming a loop around said top;
a rear strap assembly comprising a primary strap with a first end and a second end;
a first secondary strap attached to said first end of said rear strap and a second secondary strap attached to said second end of said rear strap;
a tether attached to said primary strap between said first end and said second end and located in said bed section.

2. The console pet seat of claim 1 further comprising a cover over said central frame.

3. The console pet seat of claim 2 wherein said cover comprises a cushion.

4. The console pet seat of claim 2 wherein said cover is removable.

5. The console pet seat of claim 2 wherein said cover comprises an elastic edge.

6. The console pet seat of claim 1 wherein said front strap comprises a latch.

7. The console pet seat of claim 1 wherein rear strap assembly comprises a woven cloth.

8. The console pet seat of claim 1 wherein said first secondary strap comprises a latch.

9. The console pet seat of claim 1 wherein said primary strap comprises a latch.

10. The console pet seat of claim 1 wherein said central frame comprises foam.

11. A console pet seat comprising:
a vehicle console comprising a top;
a central frame comprising sides and a bottom forming a bed section;
a front strap forming a loop around said top;
a rear strap assembly comprising a primary strap; and
a tether attached to said primary strap and located in said bed section.

12. The console pet seat of claim 11 further comprising a cover over said central frame.

13. The console pet seat of claim 12 wherein said cover comprises a cushion.

14. The console pet seat of claim 12 wherein said cover is removable.

15. The console pet seat of claim 12 wherein said cover comprises an elastic edge.

16. The console pet seat of claim 11 wherein said front strap comprises a latch.

17. The console pet seat of claim 11 wherein rear strap assembly comprises a woven cloth.

18. The console pet seat of claim 11 wherein said primary strap comprises a latch.

19. The console pet seat of claim 11 wherein said central frame comprises foam.

20. A console pet seat comprising:
a vehicle console;
a foam central frame comprising sides and a bottom forming a bed section and a removable cover over said central frame;
a front strap forming a loop around said vehicle console wherein said front strap comprises a latch;
a woven cloth rear strap comprising a latch; and
a tether attached to said rear strap and located in said bed section.

* * * * *